United States Patent [19]
Beckwith

[11] 3,883,782
[45] May 13, 1975

[54] OVERCURRENT RELAY CIRCUIT
[76] Inventor: Robert W. Beckwith, 1002 Greenfield Ln., Mount Prospect, Ill. 60056
[22] Filed: May 31, 1974
[21] Appl. No.: 474,874

[52] U.S. Cl. ............ 317/16; 307/252 B; 317/33 SC; 317/36 TD; 317/49
[51] Int. Cl. .......................................... H02h 3/10
[58] Field of Search ....... 317/33 SC, 16, 36 TD, 49; 307/252 B

[56] References Cited
UNITED STATES PATENTS

| | | | |
|---|---|---|---|
| 3,543,090 | 11/1970 | Pfister et al. | 317/33 SC |
| 3,609,457 | 9/1971 | Squiers | 317/33 SC |
| 3,801,832 | 4/1974 | Joyce | 307/252 B |

*Primary Examiner*—James D. Trammell
*Attorney, Agent, or Firm*—Anthony S. Zummer

[57] ABSTRACT
A solid-state relay circuit, which is not subject to false-triggering on transients, for switching alternating current at selected current values is herein disclosed. The solid-state relay circuit includes a current transformer for receiving a sensed alternating current and a full-wave rectifier bridge and filter connected to the current transformer for converting the sensed alternating current to a D.C. signal proportional to the sensed alternating current. A pair of switching transistors (controlled by the D.C. signal) is connected to the rectifier bridge and filter, and also to a triac having two main terminals and a gate. The switching transistors are connected between one main terminal and the gate of the triac. A resistance-capacitance network is connected between the gate and the other main terminal of the triac. The main terminals of the triac are also connected via output circuitry to an alternating current to be controlled. When alternating current is present across the main terminals of the triac, the resistance-capacitance network conducts turn-off transients to the gate, automatically holding the triac conducting by refiring the triac at alternating current zero crossings as long as the switching transistors are OFF. When the switching transistors turn ON, the turn-off transients are conducted away from the gate to the first main terminal of the triac, switching the triac non-conducting.

19 Claims, 3 Drawing Figures

Fig.1

OVERCURRENT RELAY CIRCUIT

BACKGROUND OF THE INVENTION

In an electric power-generating system, transformers are employed as part of the distribution and regulation network of the system. Frequently, these transformers are connected in parallel in the performance of their functions. Currents often flow through the parallel connections between these transformers. These currents are known as circulating currents. When circulating currents reach levels deemed undesirable, there is a need to protect the transformers from these excessive circulating currents.

Electromechanical switching devices have been employed to protect transformers from excessive circulating currents. Electromechanical devices, however, are often plagued by poor durability due to arcing and mechanical failures simply due to wear. Electromechanical current-activated switching devices also have a large input impedance, known as a burden in the art, which can upset the proper performance of the transformers by causing them to saturate.

Solid-state relays, on the other hand, are very reliable when operated within their design limits. Triacs are frequently employed in applications involving alternating current switching in which a solid-state relay is desired. Triacs, however, are subject to false-triggering when breakdown voltages, or large rates of change of voltage with respect to time, appear across their main terminals. There is a need, then, for an alternating current relay circuit having the reliability of solid-state devices without the false-triggering difficulties presently encountered with triacs.

SUMMARY OF THE INVENTION

The present invention provides a solid-state relay circuit for switching an alternating current. A sensed alternating current is received by an input section of the relay circuit. The input section converts the sensed alternating current to a D.C. signal proportional to the sensed alternating current and sets a triggering level. A pair of switching transistors is connected to the input section of the circuit and is controlled by the D.C. signal. A triac, having the gate and a pair of main terminals, is connected to the transistors at its gate and one of the main terminals. A series resistance-capacitance network is connected between the gate and the other of the main terminals of the triac. The main terminals of the triac are also connected to an alternating current to be controlled.

The resistance-capacitance network conducts turn-off transients from one of the main terminals to the gate of the triac to retrigger the triac automatically during temporary zero current excursions normally incident to alternating current. As long as the D.C. signal remains below the triggering level the switching transistors are non-conductive; and the triac will be held ON by the resistance-capacitance network. When the D.C. signal is of sufficient potential the transistors will turn ON, the turn-off transients will be conducted away from the gate of the triac to the other main terminal, and the triac will be switched OFF.

It is a principal object of the present invention to provide a relay circuit with the reliability of solid-state relays, but which does not false-trigger due to transients or noise.

It is a further object of the present invention to provide a relay circuit with a low burden.

It is a further object of the present invention to provide a relay circuit with direct controlling the triac to eliminate phasing problems between the input and output sides of the relay circuit.

It is a further object of the present invention to provide a relay with direct current controlling the triac, which allows the sensed alternating current to be of a different frequency than the alternating current to be controlled.

Other objects and uses of this invention will be readily apparent to those skilled in the art upon a perusal of the following specification in light of the accompanying drawings.

BRIEF DESCRIPTION OF THE DRAWINGS

FIG. 1 is a schematic diagram of an embodiment of the overcurrent relay circuit;

DESCRIPTION OF THE PREFERRED EMBODIMENT

Figure 1:
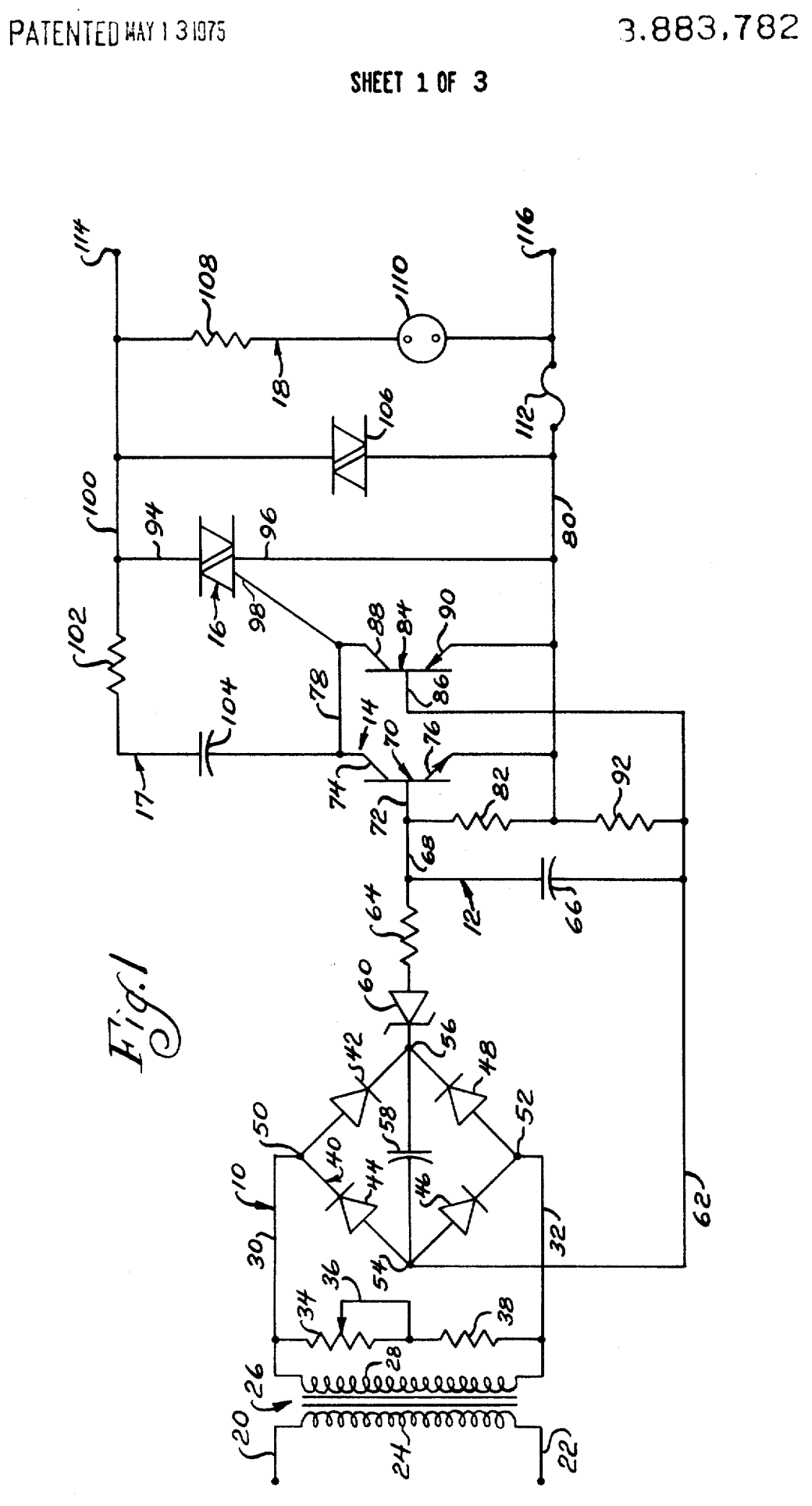
Figure 2:
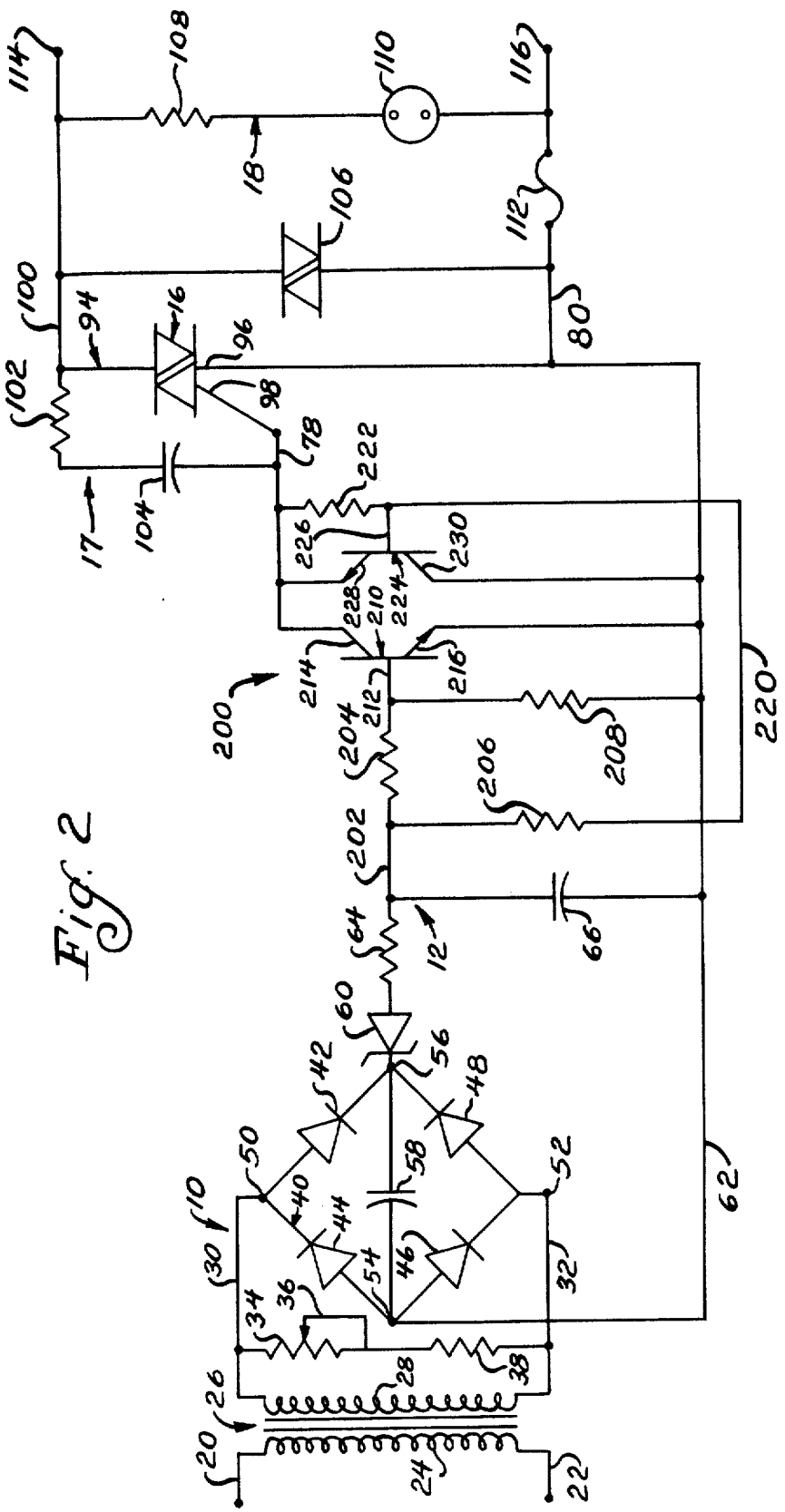
FIG. 2 is a schematic diagram of the overcurrent relay circuit, substantially identical to the relay circuit of FIG. 1 but utilizing identical transistors.

Referring now to the drawings, and especially to FIG. 1, an input circuit 10 is employed as a means for receiving a sensed current. A timing circuit 12 is connected to input circuit 10. A shorting circuit 14, employed as a shorting means, is connected to timing circuit 12. A triac 16, utilized as a solid-state bi-directional switching means, is connected to the shorting circuit 14. A resistance-capacitance network 17, employed as capacitive means, is connected to triac 16. Output and indicator circuitry 18, employed as means for connecting the solid-state bi-directional switching means to an electric current to be controlled, is connected to triac 16. Output and indicator circuitry 18 receives from an outside source the alternating current to be controlled.

Sensed alternating current is received from a source (not shown), typically paralleled circulating current transformers, through a pair of leads 20 and 22, which are connected to a primary winding 24 of a current transformer 26. Current transformer 26 has a secondary winding 28. Secondary winding 28 has a pair of secondary leads 30 and 32 attached to it. A variable resistor 34, with a movable tap 36, is connected in series with a fixed resistor 38. Both variable resistor 34 and fixed resistor 38 are connected in series across secondary leads 30 and 32 of current transformer 26.

A full-wave rectifier bridge 40 includes four diodes 42, 44, 46 and 48 arranged in a standard configuration well-known to those skilled in the art. Bridge 40 has a pair of input junctions 50 and 52, and a pair of output junctions 54 and 56. Bridge 40 is connected to secondary lead 30 at input junction 50; and is connected to secondary lead 32 at input junction 52. A filter capacitor 58 is connected across output junctions 54 and 56. A Zener diode 60 is connected in a back-biased configuration to output junction 56. A lead 62 is connected to output junction 54.

Timing circuit 12, which includes a resistor 64 and a capacitor 66, is connected to Zener diode 60. Zener diode 60 is interposed between resistor 64 and output junction 56. Capacitor 66 is connected between resistor 64 and lead 62. A lead 68 is also connected to resistor 64 opposite Zener diode 60.

An NPN transistor 70, having a base 72, a collector 74, and an emitter 76, is connected at base 72 to lead 68. Collector 74 is connected to a lead 78. Emitter 76 is connected to a lead 80. A resistor 82 is connected between base 72 of transistor 70 and lead 80. A PNP transistor 84, having a base 86, a collector 88, and an emitter 90, is connected at base 86 to lead 62. Collector 88 is connected to lead 78; and emitter 90 is connected to lead 80. A resistor 92 is connected between lead 62 and lead 80.

Triac 16, having a pair of main terminals 94 and 96 and a gate 98, has main terminal 96 connected to lead 80. Main terminal 94 of triac 16 is connected to a lead 100. Resistance-capacitance network 17, having a resistor 102 and a capacitor 104 connected in series, is connected between lead 78 and main terminal 94 of triac 16. Gate 98 of triac 16 is also connected to lead 78.

A varistor 106 is connected in parallel with triac 16, across leads 80 and 100. A resistor 108 and a neon lamp 110 are connected in series across leads 80 and 100. Resistor 108 and neon lamp 110 are in parallel with triac 16 and varistor 106. A fuse 112 is connected to lead 80 between varistor 106 and neon lamp 110. An output terminal 114 is provided on lead 100; and an output terminal 116 is provided on lead 80. An appropriate source of alternating current to be controlled is connected to output terminals 114 and 116, as is described below.

In this instance, the means for receiving a sensed alternating current includes current transformer 26; resistors 34 and 38; bridge 40; capacitor 58; and Zener diode 60, connected as described above. Sensed alternating current is supplied from an outside source, typically parallel circulating current transformers, to leads 20 and 22. Current transformer 26 provides alternating current isolation between the input and output sides of the overcurrent relay circuit. Current transformer 26 supplies an alternating potential to bridge 40, proportional to the current amplitude of the sensed alternating current in primary winding 24. Resistors 34 and 38 place a burden on current transformer 26. This burden determines the ratio of current amplitude to alternating potential. When the position of tap 36 is altered, the burden due to resistors 34 and 38 is changed; and a change in the ratio of current amplitude to alternating potential is effected.

The operating characteristics of full-wave rectifier bridge 40, which includes diodes 42, 44, 46 and 48, are well-known to those skilled in the art. The alternating potential received from current transformer 26 is converted to a D.C. signal by bridge 40. Capacitor 58, connected across output terminals 54 and 56 of bridge 40, filters the pulsating D.C. signal so that 2 smoothed D.C. signal is provided at output terminals 54 and 56 of bridge 40.

Back-biased Zener diode 60 receives the D.C. signal from output junction 56. Zener diode 60 maintains a large resistance unless the voltage of the D.C. signal exceeds the Zener diode breakdown potential. When the breakdown voltage of Zener diode 60 is exceeded, the resistance of Zener diode 60 becomes very small. When the resistance of Zener diode 60 becomes very small, the D.C. signal will begin charging capacitor 66 of timer circuit 12. As capacitor 66 charges, the potential due to the D.C. signal (impressed on bases 72 and 86 of transistor 70 and 84) increases to switching potential. It may be appreciated that there is a short time interval between Zener breakdown and application of switching potential to transistors 70 and 84.

Transistors 70 and 84 comprise the shorting means in this circuit. The transistors are operated either in the cut-off or the saturation regions. In the absence of the potential due to the D.C. signal at bases 72 and 86, transistors 70 and 84 are cut-off. When a sufficiently great D.C. signal potential is present at bases 72 and 86 of transistors 70 and 84, respectively, both transistors are saturated. The absence of the D.C. signal will keep transistors 70 and 84 OFF; and the presence of the sufficiently great D.C. signal potential will turn transistors 70 and 84 ON. Resistor 82 is effectively connected between base 72 and emitter 76 of transistor 70; and resistor 92 is effectively connected between base 86 and emitter 90 of transistor 84. Both resistor 82 and resistor 92 act to hold transistors 70 and 84, respectively, cut-off when the D.C. signal potential is less than switching voltage at bases 72 and 86. Resistors 82 and 92 act to prevent false switching of transistors 70 and 84, respectively, due to leakage in the transistors or leakage through Zener diode 60.

Triac 16, an RCA Model 40762 sensitive gate triac, is employed as the solid-state bi-directional switching means. Gate 98 is the controlling element of triac 16. Ideally, gate 98 maintains sufficient control to keep triac 16 OFF as long as triac 16 is already OFF. When a signal is injected into gate 98, triac 16 is turned ON and will conduct alternating current, typically the alternating current to be controlled, between its main terminals 94 and 96. Once triac 16 is turned ON, gate 98 is no longer able to control current flow through triac 16. When the current flow is interrupted, triac 16 switches OFF; and gate 98 can again control current flow through triac 16.

Triacs such as triac 16 have been found to falsetrigger due to voltage breakdown and due to large rates of change of voltage, such as voltage spiking. When voltage spikes are impressed across main terminals 94 and 96, triac 16 switches ON, even in the absence of a signal at gate 98. This erroneous switching clearly presents a problem when reliable performance is desired in the circuit. Experimental evidence has shown that triac 16 can be held OFF while voltage spiking is applied if gate 98 is connected to main terminal 96. Triac 16 is rendered effectively noise-immune by tying gate 98 to main terminal 96.

Series resistance-capacitance network 17, employed as the capacitive means, capacitance-couples main terminal 94 to gate 98. Switching transistors 70 and 84 are connected between gate 98 and main terminal 96.

In the absence of an excessive current, transistors 70 and 84 remain OFF; and triac 16 conducts the alternating current to be controlled. The alternating current to be controlled has zero current excursions. Triac 16 switching OFF whenever these temporary zero current excursions occur.

The alternating current to be controlled is supplied to triac 16 from an outside source, typically an inductive circuit. The outside inductive circuit causes the current to lag the voltage. When triac 16 switches OFF at zero current, the voltage across triac 16 is already increasing. The increasing voltage is coupled from main terminal 94 to gate 98 by resistance-capacitance network 17, retriggering triac 16 at the zero current excursion.

Resistor 102 of resistance-capacitance network 17 protects triac 16 from damage due to large currents from capacitor 104 discharging. Triac 16 then is retriggered automatically at every half-cycle of alternating current by resistance-capacitance network 17.

When an overcurrent occurs, transistors 70 and 84 are switched ON, tying gate 98 to main terminal 96. Signals conducted through resistance-capacitance network 17 are shorted, away from gate 98, through transistors 70 and 84, to main terminal 96. At the next zero crossing, triac 16 switches OFF. As long as transistors 70 and 84 remain ON, triac 16 is held OFF.

When the overcurrent condition ceases, transistors 70 and 84 switch OFF; and resistance-capacitance network 17 retriggers triac 16.

It may be appreciated that, when triac 16 is ON, resistance-capacitance network 17 conducts transients, such as voltage spiking, directly into gate 98. This, of course, cannot affect the conducting state of triac 16 since the triac is already ON. When triac 16 is held OFF by transistors 70 and 84, it cannot be false-triggered by voltage spiking or transients because the shorting connection of transistors 70 and 84 from gate 98 to main terminal 96 has rendered triac 16 effectively noise-immune.

Varistor 106, resistor 108, neon lamp 110, fuse 112, and terminals 114 and 116, are the means for connecting the solid-state bi-directional switching means to the electric current to be controlled. Varistor 106, connected in parallel with triac 16, stabilizes magnitude changes in the voltage of the alternating current to be controlled. This stabilizing action prevents triac 16 from false-firing due to magnitude changes in the voltage.

Resistor 108 and neon lamp 110 form a high-impedance conduction path between output terminals 114 and 116. When triac 16 is ON, current will flow around resistor 108 and neon lamp 110. If triac 16 is OFF, resistor 108 and neon lamp 110 form a conductive path for the alternating current to be controlled; and lamp 110 lights. Fuse 112 protects the overcurrent relay from surge damage.

In summary, a sensed alternating current is received by current transformer 26. An alternating potential, proportional to the amplitude of the sensed alternating current, is supplied by the secondary winding 28. The alternating potential is supplied to bridge 40 and capacitor 58, where it is changed to a D.C. signal. If the D.C. signal (which is proportional to the sensed alternating current) exceeds the breakdown potential of Zener diode 60, timer 12 times out; transistors 70 and 84 switch ON; and triac 16 switches OFF, interrupting the alternating current to the controlled and lighting lamp 110. When the D.C. signal is less than the Zener breakdown potential, transistors 70 and 84 stay OFF; triac 16 stays ON; and lamp 110 is not lighted. An adjustment of variable resistor 34 changes the burden, and also the level of sensed current at which triac 16 switches. It may be appreciated that the burden of the circuit herein disclosed is substantially lower than that of the electromechanical switching device.

It will be appreciated that the use of a D.C. signal to control the switching transistors eliminates phasing effects between the input and the output sides of the circuit. It may also be appreciated that alternating currents with differing frequencies may be employed in this circuit as the sensed alternating current and the alternating current to be controlled.

Referring now to FIG. 2 of the drawings, a variation of the overcurrent relay circuit of FIG. 1 is shown. The circuit shown in FIG. 2 is identical to the circuit shown in FIG. 1, except in its use of identical shorting transistors and associated circuitry, generally indicated by numeral 200. It will be appreciated that circuit elements having the same numbers in FIGS. 1 and 2 are identical in construction and operation to those disclosed above. Circuit elements of FIG. 2 numbered in the 200 series are not found in the overcurrent relay circuit of FIG. 1.

A lead 202 is connected to resistor 64. A pair of resistors 204 and 206 is connected to lead 202. A resistor 208 is connected between resistor 204 and lead 62. An NPN transistor 210, having a base 212, a collector 214, and an emitter 216, is connected at its base 212 to resistors 204 and 208. Collector 214 of transistor 210 is connected to a lead 218. Emitter 216 of transistor 210 is connected to lead 62.

Resistor 206 is connected to a lead 220. Lead 220 is connected to a resistor 222, Resistor 222 is connected to lead 218. An NPN transistor 224 (identical to NPN transistor 210), having a base 226, an emitter 228, and a collector 230, is connected at its base 226 to lead 220 and resistor 222. Emitter 228 of transistor 224 is connected to lead 218. Collector 230 of transistor 224 is connected to lead 226. Identical transistors are employed for manufacturing convenience and to minimize slight assymetries of operation of triac 16 which are attributable to differing betas of transistors 70 and 84.

Lead 218 is connected to capacitor 104 and lead 78. Lead 62 is connected to the junction of main terminal 96 of triac 16 and lead 80, as was described hereinabove.

NPN transistors 210 and 224 form a conducting pathway, when switched ON, in either direction between gate 98 of triac 16 and main terminal 96 of triac 16. Bases 212 and 226 are connected to emitters 216 and 228, respectively, through resistors 208 and 222. Resistors 208 and 222 prevent transistors 210 and 224 from false-triggering due to leakage from Zener diode 60 or transistors 210 and 224 themselves.

As with transistors 70 and 84, transistors 210 and 224 and biased in the cut-off region in the absence of the D.C. signal from Zener diode 60, which results from an overcurrent in the primary winding 24 of transformer 26. Transistors 210 and 224 switch to saturation when breakdown voltage is exceeded at Zener diode 60 and timer 12 times out. The operation of the circuit of FIG. 2 is identical to the operation of the circuit of FIG. 1, with the exception that identical NPN transistors 210 and 224 have similar betas. The similar betas enable triac 16 to function symmetrically for successive half-cycles of alternating current.

Figure 3:
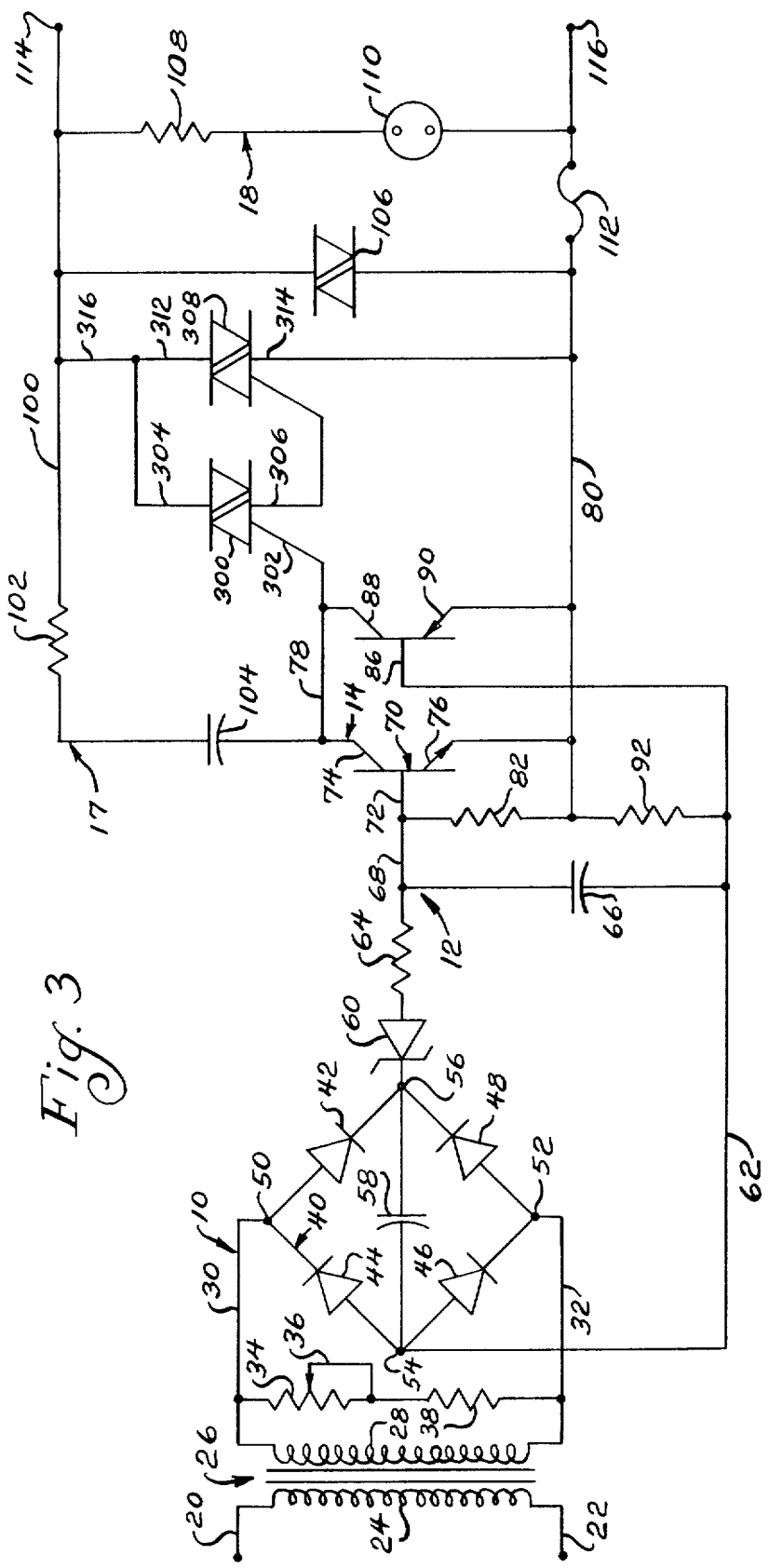
FIG. 3 is a schematic diagram of the overcurrent relay circuit, substantially identical to the relay circuit of FIG. 1 but utilizing two triacs.

Referring now to FIG. 3 of the drawings, a variation of the overcurrent relay circuit of FIG. 1 is shown therein. The circuit shown in FIG. 3 is identical to the circuit shown in FIG. 1, except in the operational control of the triac which switches the alternating current to be controlled. It will be appreciated that circuit elements having the same numbers in FIGS. 1 and 3 are identical on construction and operation to those disclosed above. Circuit elements of FIG. 3 numbered in the 300 series are not found in the overcurrent relay circuit of FIG. 1.

In FIG. 3, a triac 300, having a gate 302 and a pair of main terminals 304 and 306, is connected at its gate 302 to lead 78. Another triac 308, having a gate 310 and a pair of main terminals 312 and 314, is connected to triac 300. Main terminal 304 of triac 300 is connected to main terminal 312 of triac 308. Main terminal 306 of triac 300 is connected to gate 310 of triac 308. Main terminal 312 of triac 308 is connected to a lead 316. Main terminal 314 is connected to lead 80. Lead 316 is connected to lead 100.

Triac 300 is low current-handling capacity triac which is used to control a larger current-handling capacity triac 308. When triac 300 is switch ON, triac 308 switches ON. When triac 300 switches OFF, triac 308 switches OFF. It may be appreciated that triacs 300 and 308 function together as a single triac having a gate 302 and main terminals 316 and 314. All other portions of the circuit function as hereinabove described.

Although a specific embodiment of the herein-disclosed invention has been described in detail, it is readily apparent that those skilled in the art may make various modifications and changes in the present circuit without departing from the spirit and scope of the present invention. Therefore, the present invention is limited only by the appended claims.

What is claimed is:

1. An electric circuit for use in controlling an electric current, comprising: means for receiving a sensed current; shorting means connected to the means for receiving the sensed current, said shorting means being responsive to an electrical condition of the sensed current; solid-state bi-directional switching means having a pair of main terminals and a gate, said shorting means being connected between one of said main terminals and the gate of the solid-state bi-directional switching means, said shorting means controlling said solid-state bi-directional switching means; capacitive means connected between the gate and the other of said main terminals of said solid-state bi-directional switching means, said capacitive means coupling transients from the other of said main terminals to the gate of the solid-state bi-directional switching means to maintain a conducting state through the solid-state bi-directional switching means during change in direction of the current between the main terminals; and means for connecting the solid-state bi-directional switching means to the electric current to be controlled.

2. An electric circuit as defined in claim 1 wherein the solid-state bi-directional switching means is a triac.

3. An electric circuit as defined in claim 1 wherein the shorting means includes a pair of transistors, said pair of transistors being connected between the gate and one of the main terminals of the solid-state bi-directional switching means.

4. An electric circuit as defined in claim 1 wherein the capacitive means includes a series resistance-capacitance circuit connected between the gate and the other of said main terminals of the solid-state bi-directional switching means.

5. An electric circuit as defined in claim 1 wherein the means for receiving a sensed current includes adjustable resistance means for determining the response level of the shorting means to the sensed current.

6. An electric circuit as defined in claim 1 wherein the means for receiving a sensed current includes rectifier and filter means connected to the shorting means, said rectifier and filter means supplying a D.C. signal to the shorting means.

7. An electric circuit as defined in claim 1 wherein the means for receiving a sensed current includes transformer means having a primary and a secondary winding, said transformer means receiving the sensed current at the primary winding and connected to the shorting means through the secondary winding, the transformer means being employed to provide isolation between the means for receiving the sensed current and the means for connecting the solid-state bi-directional switching means to the electric current to be controlled.

8. An electric circuit as defined in claim 1, including a varistor connected in parallel with the solid-state bi-directional switching means.

9. An electric circuit as defined in claim 1 wherein the shorting means includes time-delay means connected to the means for receiving the sensed current.

10. An electric circuit as defined in claim 1, including a Zener diode for determination of the response level of the shorting means to the sensed current.

11. An electric circuit as defined in claim 1 wherein the circuit includes indicator means connected to the solid-state bi-directional switching means, said indicator means displaying the state of conduction of the solid-state bi-directional switching means.

12. An electric circuit as defined in claim 1 wherein the shorting means includes a pair of transistors, and the solid-state bi-directional switching means is a triac.

13. An electric circuit as defined in claim 1 wherein the shorting means includes a pair of transistors, the solid-state bi-directional switching means is a triac, and the capacitive means is a series resistance-capacitance circuit.

14. An electric circuit as defined in claim 1, including adjustable resistance means and a Zener diode, said adjustable resistance means being connected to the Zener diode, said Zener diode being connected to the shorting means, said adjustable resistance means and said Zener diode acting in conjunction for determination of the response level of the shorting means to the sensed current.

15. An electric circuit as defined in claim 1 wherein the shorting means includes capacitive means connected to the means for receiving the sensed current, said capacitive means providing a time delay.

16. An electric circuit as defined in claim 1 wherein the shorting means includes a pair of identical transistors, said pair of identical transistors being connected between the gate and one of the main terminals of the solid-state bi-directional switching means.

17. An electric circuit for use in controlling an electric current, comprising: transformer means for receiving a sensed current, adjustable resistance means connected to said transformer means for adjusting the burden of the circuit; rectifier and filter means connected to the adjustable resistance means; a Zener diode connected to the rectifier and filter means; time-delay means connected to the Zener diode; transistor shorting means connected to the time-delay means, said transistor shorting means being responsive to the sensed current; a triac having a gate and a pair of main terminals, said transistor shorting means being connected between the gate and one of the main terminals of the triac, said transistor shorting means controlling the triac; capacitive means connected between the gate and the other of said main terminals of said triac, said capacitive means coupling transients from the other of said main terminals of the triac to the gate of the triac to maintain a conducting state through the triac during change in direction of the current between the main terminals; a varistor connected to the triac; indicator means connected to the triac for displaying the state of conduction of the triac; and output means connected to the triac for connection of the triac to the electric current to be controlled.

18. An electric circuit for use in controlling an electric current, comprising: transformer means for receiving a sensed current; adjustable resistance means connected to said transformer means for adjusting the burden of the circuit; rectifier and filter means connected to the adjustable resistance means; a Zener diode connected to the rectifier and filter means; time-delay means connected to the Zener diode; transistor shorting means connected to the time-delay means, said transistor shorting means being responsive to the sensed current; a first triac having a gate and a pair of main terminals, said gate of the first triac being connected to the transistor shorting means; a second triac having a gate and a pair of main terminals, one of the main terminals of the first triac being connected to the gate of the second triac, and other of said main terminals of the first triac being connected to one of said main terminals of the second triac and the other of the main terminals of the second triac being connected to the transistor shorting means, said transistor shorting means controlling the first and second triacs; capacitive means connected between the gate of the first triac and one of said main terminals of the second triac, said capacitive means coupling transients from one of the main terminals of the second triac to the gate of the first triac to maintain a conducting state through the first and second triacs during change in direction of the current between the main terminals of the first and second triacs; a varistor connected to the second triac; indicator means connected to the second triac for displaying the state of conduction of the second triac; and output means connected to the second triac for connecting the second triac to the electric current to be controlled.

19. An electric circuit for use in controlling an electric current, comprising: means for receiving sensed current; shorting means connected to the means for receiving the sensed current, said shorting means being responsive to an electrical condition of the sensed current; a first triac having a gate and a pair of main terminals, said gate of the first triac being connected to the shorting means; a second triac having a gate and a pair of main terminals, one of the main terminals of the first triac being connected to the gate of the second triac, the other of said main terminals of the first triac being connected to one of said main terminals of the second triac and the other of said main terminals of the second triac being connected to the shorting means, said shorting means controlling the first and second triacs, capacitive means connected between the gate of the first triac and one of said main terminals of the second triac, said capacitive means coupling transients from one of the main terminals of the second triac to the gate of the first triac to maintain a conducting state through the first and second triacs during change in direction of the current between the main terminals of the first and second triacs; and means for connecting the second triac to the electric current to be controlled.

* * * * *